US009736806B2

United States Patent
Kafle et al.

(10) Patent No.: US 9,736,806 B2
(45) Date of Patent: Aug. 15, 2017

(54) APPARATUSES AND METHODS FOR WIRELESS SYNCHRONIZATION OF MULTIPLE MULTIMEDIA DEVICES USING A COMMON TIMING FRAMEWORK

(71) Applicant: QUALCOMM Incorporated, San Diego, CA (US)

(72) Inventors: Padam Lal Kafle, San Diego, CA (US); Khosro Mohammad Rabii, San Diego, CA (US); Reid Matthew Westburg, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 14/624,844

(22) Filed: Feb. 18, 2015

(65) Prior Publication Data

US 2015/0249967 A1    Sep. 3, 2015

Related U.S. Application Data

(60) Provisional application No. 61/946,053, filed on Feb. 28, 2014.

(51) Int. Cl.
*H04W 56/00* (2009.01)
*H04L 29/06* (2006.01)
(Continued)

(52) U.S. Cl.
CPC ........... *H04W 56/004* (2013.01); *H04L 65/80* (2013.01); *H04N 21/4104* (2013.01);
(Continued)

(58) Field of Classification Search
CPC ........... H04W 56/004; H04W 56/0015; H04N 21/4305; H04N 21/4104; H04L 65/80
See application file for complete search history.

(56) References Cited

U.S. PATENT DOCUMENTS 7,733,835 B2 * 6/2010 Sammour ......... H04W 52/0235
                                                                370/338
7,877,514 B2    1/2011 Shao et al.
(Continued)

FOREIGN PATENT DOCUMENTS

WO    2014051403 A1    4/2014

OTHER PUBLICATIONS

Second Written Opinion for PCT/US2015/016601, mailed Jan. 19, 2016, 4 pages.
(Continued)

*Primary Examiner* — Mohammad Anwar
(74) *Attorney, Agent, or Firm* — Withrow & Terranova, PLLC

(57) ABSTRACT

Apparatuses and methods for wireless synchronization of multiple multimedia devices using a common timing framework are disclosed. In one aspect, a wireless multimedia source device is configured to establish wireless connections with a plurality of multimedia sink devices. The wireless multimedia source device is further configured to calculate a correction time interval for each multimedia sink device based on a difference between a master program clock reference ($M_{PCR}$) and a local program clock reference ($L_{PCR}$) feedback signal from the multimedia sink device. Presentation time stamp (PTS) data is generated based on the correction time interval and provided to the multimedia sink device. In another aspect, a wireless multimedia sink device is configured to receive a correction time interval based on a difference between an $M_{PCR}$ for the multimedia source device and an $L_{PCR}$ for the multimedia sink device, and calculate an updated $L_{PCR}$ based on the correction time interval.

20 Claims, 8 Drawing Sheets

(51) Int. Cl.
    *H04N 21/436*     (2011.01)
    *H04N 21/4363*     (2011.01)
    *H04N 21/41*     (2011.01)
    *H04N 21/43*     (2011.01)
    *H04N 21/647*     (2011.01)

(52) U.S. Cl.
    CPC ... *H04N 21/4305* (2013.01); *H04N 21/43615* (2013.01); *H04N 21/43637* (2013.01); *H04N 21/64784* (2013.01); *H04W 56/0015* (2013.01)

(56) References Cited

U.S. PATENT DOCUMENTS

| | | | |
|---|---|---|---|
| 8,102,836 B2 | 1/2012 | Jerlhagen et al. | |
| 2004/0109519 A1* | 6/2004 | Mizukami | H04N 21/4305 375/362 |
| 2005/0036512 A1 | 2/2005 | Loukianov | |
| 2005/0177643 A1* | 8/2005 | Xu | H04N 21/242 709/231 |
| 2007/0030821 A1* | 2/2007 | Iwamura | H04L 1/205 370/328 |
| 2008/0178243 A1 | 7/2008 | Dong et al. | |
| 2009/0031365 A1 | 1/2009 | Kwon et al. | |
| 2009/0285217 A1 | 11/2009 | Frink et al. | |
| 2013/0188632 A1* | 7/2013 | Sheth | H04N 21/4302 370/350 |
| 2013/0234913 A1 | 9/2013 | Thangadorai et al. | |
| 2013/0238702 A1 | 9/2013 | Sheth et al. | |
| 2014/0003367 A1* | 1/2014 | Viger | H04W 74/0816 370/329 |
| 2014/0118473 A1* | 5/2014 | Halavy | H04N 7/152 348/14.09 |

OTHER PUBLICATIONS

International Preliminary Report on Patentability for PCT/US2015/016601, mailed May 17, 2016, 18 pages.
Author Unknown, "WET Sanitary Design," XP055184376, Feb. 12, 2012, Retrieved from the Internet: URL: http://web.archive.org/web/20120212125538/http://www.wet.co.it/MELTDOWNbyWET.htm, retrieved on Apr. 20, 2015, 3 pages.
International Search Report and Written Opinion for Patent Application No. PCT/US2015/016601, mailed May 4, 2015, 11 pages.

* cited by examiner

U.S. 9,736,806 B2

APPARATUSES AND METHODS FOR WIRELESS SYNCHRONIZATION OF MULTIPLE MULTIMEDIA DEVICES USING A COMMON TIMING FRAMEWORK

PRIORITY CLAIM

The present application claims priority to U.S. Provisional Patent Application Ser. No. 61/946,053 filed on Feb. 28, 2014, and entitled "SYSTEMS AND METHODS FOR WIRELESS SYNCHRONIZATION OF MULTIPLE MULTIMEDIA DEVICES USING A COMMON TIMING FRAMEWORK," which is incorporated herein by reference in its entirety.

BACKGROUND

I. Field of the Disclosure

The technology of the disclosure relates generally to operations of a timing framework within wireless multimedia systems.

II. Background

As the use of wireless mobile devices, such as smart phones, has proliferated, the number and types of applications available for the wireless mobile devices have increased. One of the most common types of mobile applications provides for the storage and playback of multimedia content. While earlier generations of such applications have focused on music, the use of video files is also being enabled on newer mobile devices as wireless networks provide greater bandwidth and the mobile devices provide greater processing power.

In the earliest aspects of audio- and video-capable mobile devices, a user would typically listen to audio or audio elements within a video file using wired headphones, and later using a wireless headphone set. Many wireless headsets initially were designed to work using the Bluetooth® protocol, and this protocol remains popular among many users. Recently, however, the Wi-Fi Alliance has promulgated the Miracast™ standard, also known as Wi-Fi Display (WFD), to enable wireless screencasting based on underlying 802.11 standards promulgated by the Institute for Electrical and Electronics Engineering (IEEE). Screencasting according to the Miracast standard enables wireless delivery of audio and video to or from desktops, tablets, smart phones and other devices. For example, a user may echo a display from a phone or tablet onto a television, or share a laptop screen with a conference room projector in real time, as non-limiting examples.

Early efforts to screencast or otherwise wirelessly stream audio to a user were bandwidth-limited, which necessarily resulted in compromises in the quality of the audio so produced. As available bandwidth has increased, so has demand for more sophisticated audio capabilities (e.g., six-, seven-, or eight-channel surround sound, as non-limiting examples). Current standards and protocols may not be suited to provide such sophisticated media capabilities in a wireless context, particularly with regards to synchronization of content streams. In particular, while the existing Miracast standard allows point-to-point communication, it does not support point-to-multipoint communication for sharing multimedia content. Moreover, the Moving Pictures Expert Group version 2 transport stream (MPEG2-TS)-based timing framework used in the current Miracast standard only provides for synchronization of multimedia streams received by a single multimedia sink device.

SUMMARY OF THE DISCLOSURE

Aspects disclosed in the detailed description include apparatuses and methods for wireless synchronization of multiple multimedia devices using a common timing framework. In one aspect, a method for providing wireless synchronization of multimedia sink devices is provided. The method comprises establishing, by a multimedia source device, a plurality of wireless connections with a corresponding plurality of multimedia sink devices. The method further comprises, for each multimedia sink device of the plurality of multimedia sink devices, transmitting a master program clock reference ($M_{PCR}$) to the multimedia sink device. The method also comprises, for each multimedia sink device, receiving, by the multimedia source device, a local program clock reference ($L_{PCR}$) feedback signal from the multimedia sink device. The method additionally comprises, for each multimedia sink device, calculating a correction time interval based on a difference between the $M_{PCR}$ at reception and the $L_{PCR}$ feedback signal. The method further comprises, for each multimedia sink device, generating presentation time stamp (PTS) data corresponding to a multimedia stream sent to the multimedia sink device, based on the correction time interval. The method also comprises, for each multimedia sink device, providing the PTS data to the multimedia sink device.

In another aspect, a method for synchronizing a multimedia sink device with a multimedia source device is provided. The method comprises establishing, by a multimedia sink device, a wireless connection with a multimedia source device. The method further comprises transmitting a program clock reference (PCR) request to the multimedia source device. The method also comprises receiving, in response to the PCR request, a correction time interval based on a difference between a $M_{PCR}$ for the multimedia source device and a $L_{PCR}$ for the multimedia sink device. The method further comprises calculating an updated $L_{PCR}$ based on the correction time interval. The method also comprises receiving a multimedia stream from the multimedia source device. The method additionally comprises presenting the multimedia stream based on the updated $L_{PCR}$.

In another aspect, a wireless multimedia source device is provided. The wireless multimedia source device comprises a wireless network interface controller communicatively coupled to an antenna, a system clock, and a control system communicatively coupled to the wireless network interface controller and the system clock. The control system is configured to establish, using the wireless network interface controller, a plurality of wireless connections with a corresponding plurality of multimedia sink devices. The control system is further configured to, for each multimedia sink device of the plurality of multimedia sink devices, transmit, via the wireless network interface controller, an $M_{PCR}$ provided by the system clock to the multimedia sink device. The control system is also configured to, for each multimedia sink device of the plurality of multimedia sink devices, receive, via the wireless network interface controller, an $L_{PCR}$ feedback signal from the multimedia sink device. The control system is additionally configured to, for each multimedia sink device of the plurality of multimedia sink devices, calculate a correction time interval based on a difference between the $M_{PCR}$ at reception and the $L_{PCR}$ feedback signal. The control system is further configured to, for each multimedia sink device of the plurality of multimedia sink devices, generate PTS data corresponding to a multimedia stream sent to the multimedia sink device, based on the correction time interval. The control system is also configured to, for each multimedia sink device of the plurality of multimedia sink devices, provide, via the wireless network interface controller, the PTS data to the multimedia sink device.

In another aspect, a wireless multimedia sink device is provided. The wireless multimedia sink device comprises a transceiver communicatively coupled to an antenna, a system clock, and a control system communicatively coupled to the transceiver and the system clock. The control system is configured to establish, using the transceiver, a wireless connection with a multimedia source device. The control system is further configured to transmit, via the transceiver, a PCR request to the multimedia source device. The control system is also configured to receive, via the transceiver in response to the PCR request, a correction time interval based on a difference between an $M_{PCR}$ for the multimedia source device and an $L_{PCR}$ provided by the system clock. The control system is additionally configured to calculate an updated $L_{PCR}$ based on the correction time interval. The control system is further configured to receive, via the transceiver, a multimedia stream from the multimedia source device. The control system is also configured to present the multimedia stream based on the updated $L_{PCR}$.

DETAILED DESCRIPTION

Figure 1:
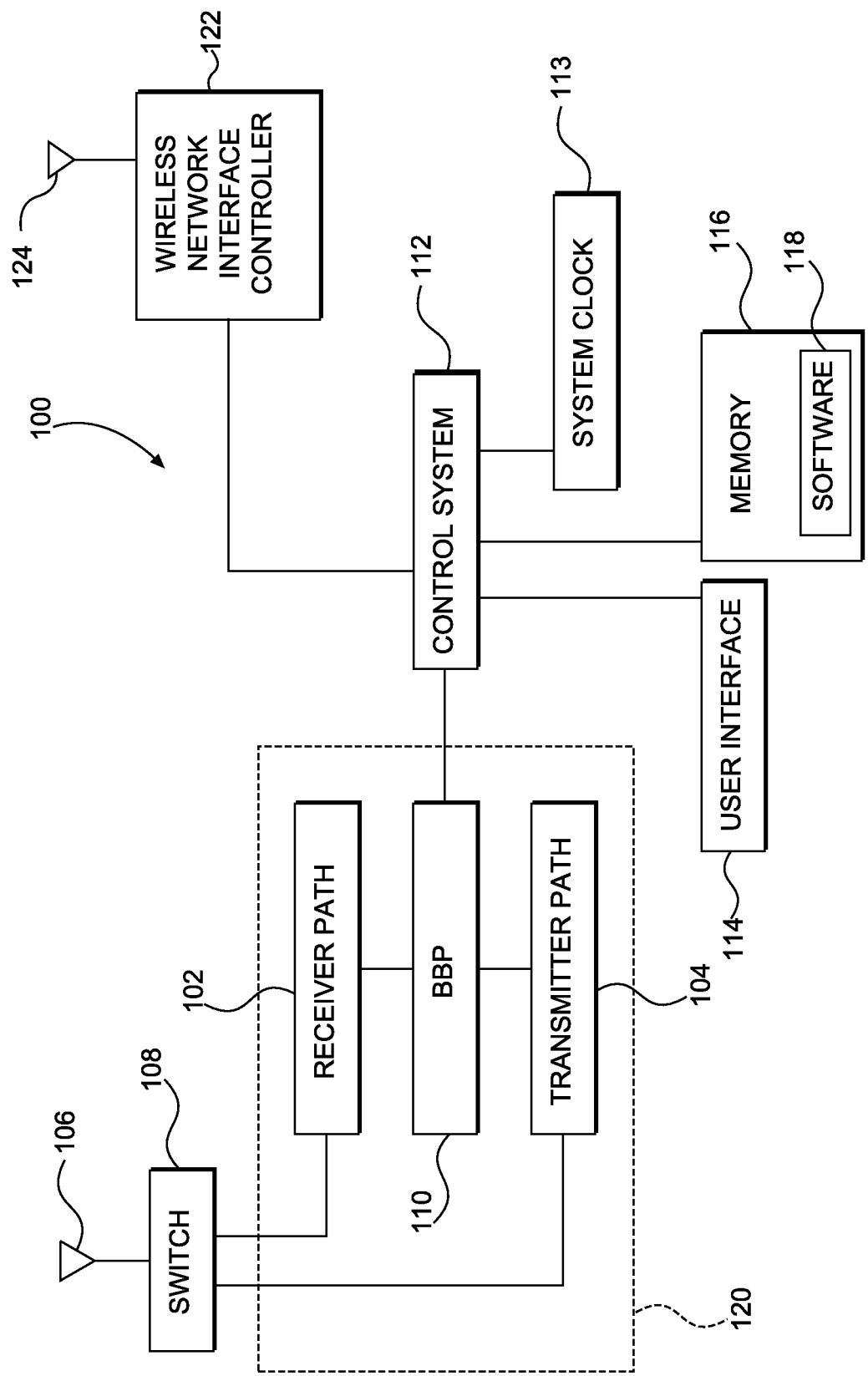
FIG. 1 is a block diagram of an exemplary multimedia source device for providing wireless synchronization.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include apparatuses and methods for wireless synchronization of multiple multimedia devices using a common timing framework. In one aspect, a method for providing wireless synchronization of multimedia sink devices is provided. The method comprises establishing, by a multimedia source device, a plurality of wireless connections with a corresponding plurality of multimedia sink devices. The method further comprises, for each multimedia sink device of the plurality of multimedia sink devices, transmitting a master program clock reference ($M_{PCR}$) to the multimedia sink device. The method also comprises, for each multimedia sink device, receiving, by the multimedia source device, a local program clock reference ($L_{PCR}$) feedback signal from the multimedia sink device. The method additionally comprises, for each multimedia sink device, calculating a correction time interval based on a difference between the $M_{PCR}$ at reception and the $L_{PCR}$ feedback signal. The method further comprises, for each multimedia sink device, generating presentation time stamp (PTS) data corresponding to a multimedia stream sent to the multimedia sink device, based on the correction time interval. The method also comprises, for each multimedia sink device, providing the PTS data to the multimedia sink device.

In another aspect, a method for synchronizing a multimedia sink device with a multimedia source device is provided. The method comprises establishing, by a multimedia sink device, a wireless connection with a multimedia source device. The method further comprises transmitting a program clock reference (PCR) request to the multimedia source device. The method also comprises receiving, in response to the PCR request, a correction time interval based on a difference between a $M_{PCR}$ for the multimedia source device and a $L_{PCR}$ for the multimedia sink device. The method further comprises calculating an updated $L_{PCR}$ based on the correction time interval. The method also comprises receiving a multimedia stream from the multimedia source device. The method additionally comprises presenting the multimedia stream based on the updated $L_{PCR}$.

Figure 2:
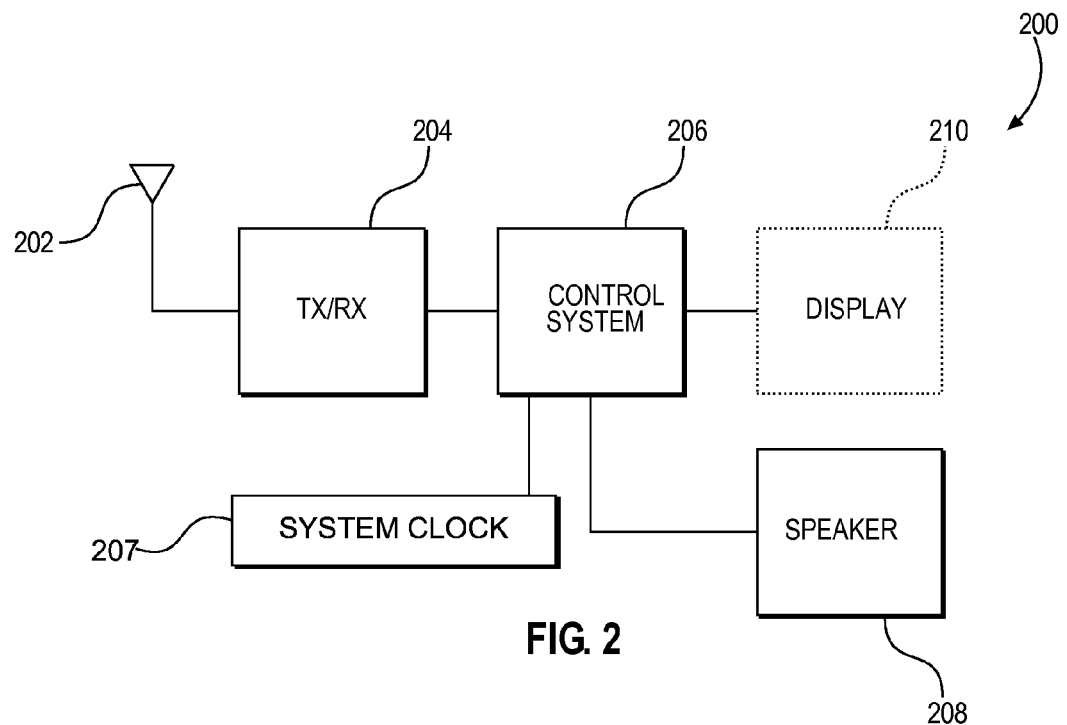
FIG. 2 is a block diagram of an exemplary multimedia sink device for providing wireless synchronization.
Figure 3:
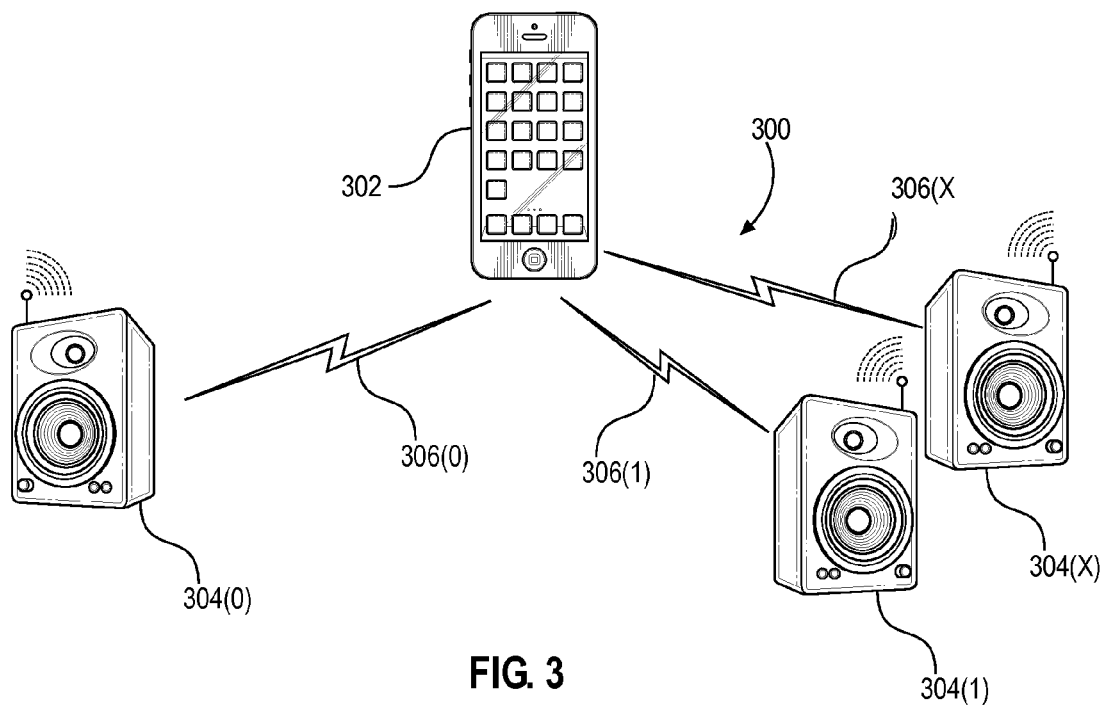
FIG. 3 is an illustration of an exemplary aspect of a simplified multimedia system including aspects of the multimedia source device of FIG. 1 and the multimedia sink device of FIG. 2.
Figure 4:
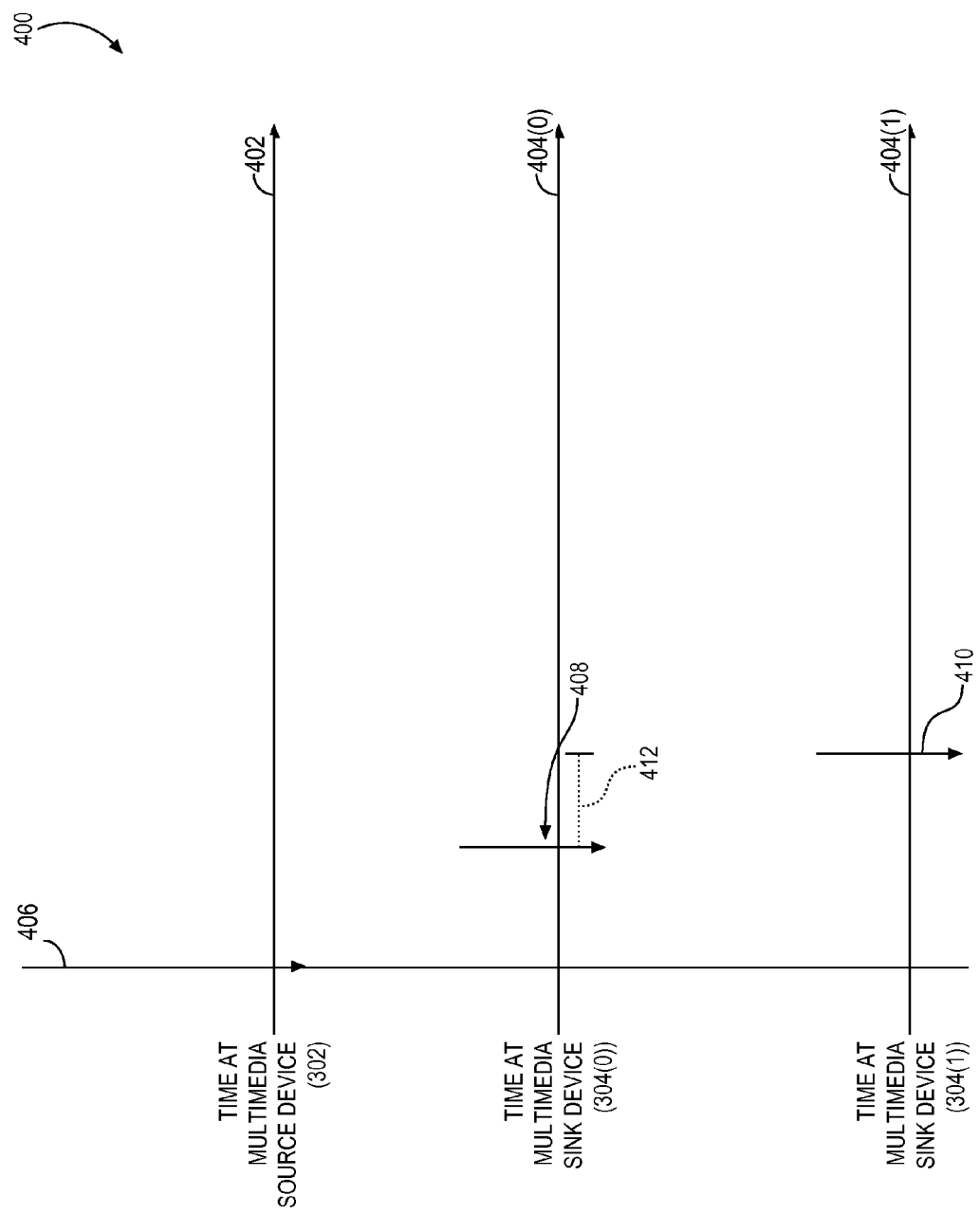
FIG. 4 is a signal diagram illustrating synchronization issues that may arise with point-to-multipoint wireless multimedia signals in conventional multimedia systems lacking a synchronization mechanism.

Before discussing wireless synchronization of multiple multimedia devices, exemplary mobile devices and point-to-multipoint multimedia systems are described, along with potential undesirable effects that may result from different multimedia stream arrival times and differences in the local timing reference of multimedia sink devices in the multimedia systems. In this regard, FIGS. 1-4 are provided. FIG. 1 illustrates an exemplary mobile device that may act as a multimedia source device for providing wireless synchronization, while FIG. 2 illustrates elements of an exemplary multimedia sink device. FIG. 3 illustrates an exemplary wireless multimedia system that may incorporate the multimedia source device of FIG. 1 and the multimedia sink device of FIG. 2. FIG. 4 is a diagram that illustrates issues that may arise with point-to-multipoint wireless multimedia signals in conventional multimedia systems lacking a synchronization mechanism In FIG. 1, a multimedia source device 100 is provided. The multimedia source device 100 may comprise, as non-limiting examples, a smart phone or tablet, or other mobile computing device. The multimedia source device 100 of FIG. 1 includes a receiver path 102, a transmitter path 104, an antenna 106, a switch 108, a baseband processor (BBP) 110, a control system 112, a system clock 113 generating clock signals (not shown), a frequency synthesizer (not shown), a user interface 114, and memory 116 with software 118 stored therein. It is to be understood that the elements of the multimedia source device 100 are shown for illustrative purposes only, and that some aspects of the multimedia source device 100 may include more or fewer elements than shown in FIG. 1.

In exemplary operation, the receiver path 102 of the multimedia source device 100 may receive information-bearing radio frequency (RF) signals from one or more remote transmitters provided by a base station (not shown), such as a cellular network base station. A low noise amplifier (not shown) may amplify the signals. A filter (not shown) may minimize broadband interference in the received signals, while down-conversion circuitry (not shown) may down-convert the filtered signals into intermediate or baseband frequency signals, which then may be digitized into one or more digital streams by digitization circuitry (not shown). In some aspects, the receiver path 102 may use one or more mixing frequencies generated by the frequency synthesizer. The BBP 110 processes the digitized received signal to extract the information (e.g., data bits, as a non-limiting example) conveyed in the signal. As such, the BBP 110 may be implemented as one or more digital signal processors (DSPs), as a non-limiting example.

With continued reference to FIG. 1, on the transmit side, the BBP 110 may receive digitized data (representing, e.g., voice, data, or control information, as non-limiting examples) from the control system 112, which the BBP 110 then encodes for transmission. The encoded data is output to the transmitter path 104, where it may be used by a modulator (not shown) to modulate a carrier signal at a desired transmit frequency. An RF power amplifier (not shown) may amplify the modulated carrier signal to a level appropriate for transmission, and may deliver the amplified and modulated carrier signal to the antenna 106 through the switch 108. Collectively, the receiver path 102, the transmitter path 104, and the frequency synthesizer may be considered a wireless modem 120.

Referring still to FIG. 1, a user (not shown) may interact with the multimedia source device 100 via the user interface 114. In some aspects, the user interface 114 may comprise a microphone, a speaker, a keypad, and/or a display, as non-limiting examples. Some aspects may provide that audio information encoded in the received signal is recovered by the BBP 110, and converted into an analog signal suitable for driving the speaker (not shown). In some aspects, the keypad and display of the user interface 114 may enable the user to interact with the multimedia source device 100. For example, the keypad and display may enable the user to input numbers to be dialed, access address book information, and/or monitor call progress information, as non-limiting examples. The memory 116 may have the software 118 therein as noted above, which may effectuate exemplary aspects of the present disclosure.

With further reference to FIG. 1, the multimedia source device 100 may include a wireless network interface controller 122 with its own antenna 124. In some aspects, the wireless network interface controller 122 may operate according to a known protocol, such as those published by the Institute for Electrical and Electronics Engineering (IEEE) within the 802.11 family and as promoted by the Wi-Fi Alliance. These protocols may include wireless local area network (WLAN) techniques, popularly known as Wi-Fi systems, that may utilize contention-based carrier sense multiple access with collision avoidance (CSMA/CA) mechanisms to access a wireless medium. In some aspects, the wireless network interface controller 122 may have its own transceiver (not shown) having its own transmitter path and its own receiver path (neither shown) and operating with its own BBP, while some aspects may provide that the wireless network interface controller 122 uses the BBP 110. Audio and/or video content may be stored in the memory 116, and/or may be retrieved from a remote source (e.g., streamed via a network such as the internet). In normal operation, the user may view video content through a display provided by the user interface 114, and/or may listen to audio content through speakers provided by the user interface 114.

According to protocols promulgated by the Wi-Fi Alliance, such as Miracast™ (also referred to as Wi-Fi Display or WFD), the multimedia source device 100 may stream audio and/or video to a remote multimedia sink device, such as a speaker and/or large screen display. In this regard, a multimedia sink device 200 is illustrated in FIG. 2. In the example of FIG. 2, wireless signals are received and transmitted through an antenna 202 coupled to a transceiver (Tx/Rx) 204. While not illustrated, the transceiver 204 may include a receiver path, a transmitter path, and a BBP having functionality corresponding to the receiver path 102, the transmitter path 104, and the BBP 110, respectively, of FIG. 1. A control system 206 is operatively coupled to the transceiver 204, and may receive instructions embedded within the wireless signals received by the transceiver 204. The control system 206 is also coupled to a system clock 207, which may provide a clock signal (not shown) to the control system 206. The control system 206 may further be coupled to one or more output devices, including but not limited to a speaker 208 and/or a display 210. In exemplary aspects, the multimedia sink device 200 may be a television with the display 210 and speakers 208, or one speaker 208 among a plurality of speakers 208 in, e.g., a surround sound system.

FIG. 3 illustrates an exemplary wireless multimedia system 300 that may provide streaming of multimedia content from a multimedia source device to multiple multimedia sink devices. As seen in FIG. 3, the wireless multimedia system 300 may provide a multimedia source device 302, which in some aspects may comprise the multimedia source device 100 of FIG. 1. The wireless multimedia system 300 may further include a plurality of multimedia sink devices 304(0)-304(X), each of which may comprise the multimedia sink device 200 of FIG. 2. The multimedia source device 302 communicates with the multimedia sink devices 304(0)-304(X) through wireless signals 306(0)-306(X), respectively. In some aspects, the wireless signals 306(0)-306(X) may conform to one of the IEEE 802.11 standards operating under the Wi-Fi designation.

As noted above, conventional multimedia systems lack mechanisms for synchronizing multimedia content provided to multiple multimedia sink devices in a point-to-multipoint architecture. In the absence of a synchronization mechanism, the wireless signals 306(0)-306(X) of FIG. 3 may arrive at different ones of the multimedia sink devices 304(0)-304(X) at different times. This may result in a suboptimal multimedia experience for a user. For example, in aspects in which the wireless signals 306(0)-306(X) comprise audio channels of a surround sound system, different arrival times and differences in the local timing reference of each of the multimedia sink devices 304(0)-304(X) may cause audio playback to be discordant, spoiling the desired surround sound effect.

To further illustrate the effect of unsynchronized wireless signals in a conventional multimedia system, FIG. 4 is provided. FIG. 4 is a signal diagram 400 showing the timing of wireless signals transmitted by a multimedia source device, such as the multimedia source device 302 of FIG. 3, and received by two multimedia sink devices, such as the multimedia sink devices 304(0) and 304(1) of FIG. 3. In the example of FIG. 4, horizontal arrows 402, 404(0), and 404(1) represent a local time at each of the multimedia source device 302 and the multimedia sink devices 304(0) and 304(1), respectively. The multimedia source device 302 may transmit a signal (e.g., a multimedia stream) to both of the multimedia sink devices 304(0) and 304(1) at a time 406. The multimedia sink device 304(0) may receive the signal a time 408, but the multimedia sink device 304(1) may receive the same signal at a later time 410. This may happen, for instance, if the multimedia sink device 304(1) is physically located farther away from the multimedia source device 302 than the multimedia sink device 304(0), or if a processing delay at the multimedia sink device 304(1) is higher. If a time difference 412 is sufficiently large, a user may detect discordance in the presentation of the multimedia stream between the multimedia sink devices 304(0) and 304(1), and may find the quality of the multimedia stream to be unacceptably degraded. Unlike in a point-to-point scenario, the delivery of a common timing reference from the multimedia source device to multiple multimedia sink devices to establish a common timing framework may become difficult due to variable link delays and/or processing time at each multimedia sink device.

While the Wi-Fi protocol includes a media access control (MAC) layer timing framework known as the timing synchronization function (TSF), this timing framework may not be suitable for synchronization of multimedia content handled at upper layers (such as, e.g., the MPEG2 layer) in practice. In contrast, the PCR provided by MPEG2-TS has a relatively precise timing framework that is derived from a 27 MHz clock widely used by devices for transmitting and receiving multimedia streams. However, conventional Wi-Fi systems based on IEEE 802.11 protocols do not query the MPEG2 layer components to make use of PCR timing signals provided by MPEG2-TS, and the TSF timing information is not usually available to upper layers. Thus, exemplary aspects as disclosed herein employ the MPEG2-TS PCR to assist in providing PTS data for synchronizing presentation of multimedia content by the multimedia sink devices 304(0)-304(X) of FIG. 3. By using the more precise and already existing timing framework of MPEG2-TS PCR as a feedback signal, delay between the multimedia source device 302 and the multimedia sink devices 304(0)-304(X) may be calculated, and a timing correction signal may be provided to synchronize wirelessly the presentation of a multimedia stream by the multimedia sink devices 304(0)-304(X). In this manner, the multimedia stream may be rendered by the multimedia sink devices 304(0)-304(X) at a synchronized point in time for achieving optimal quality.

Figure 5:
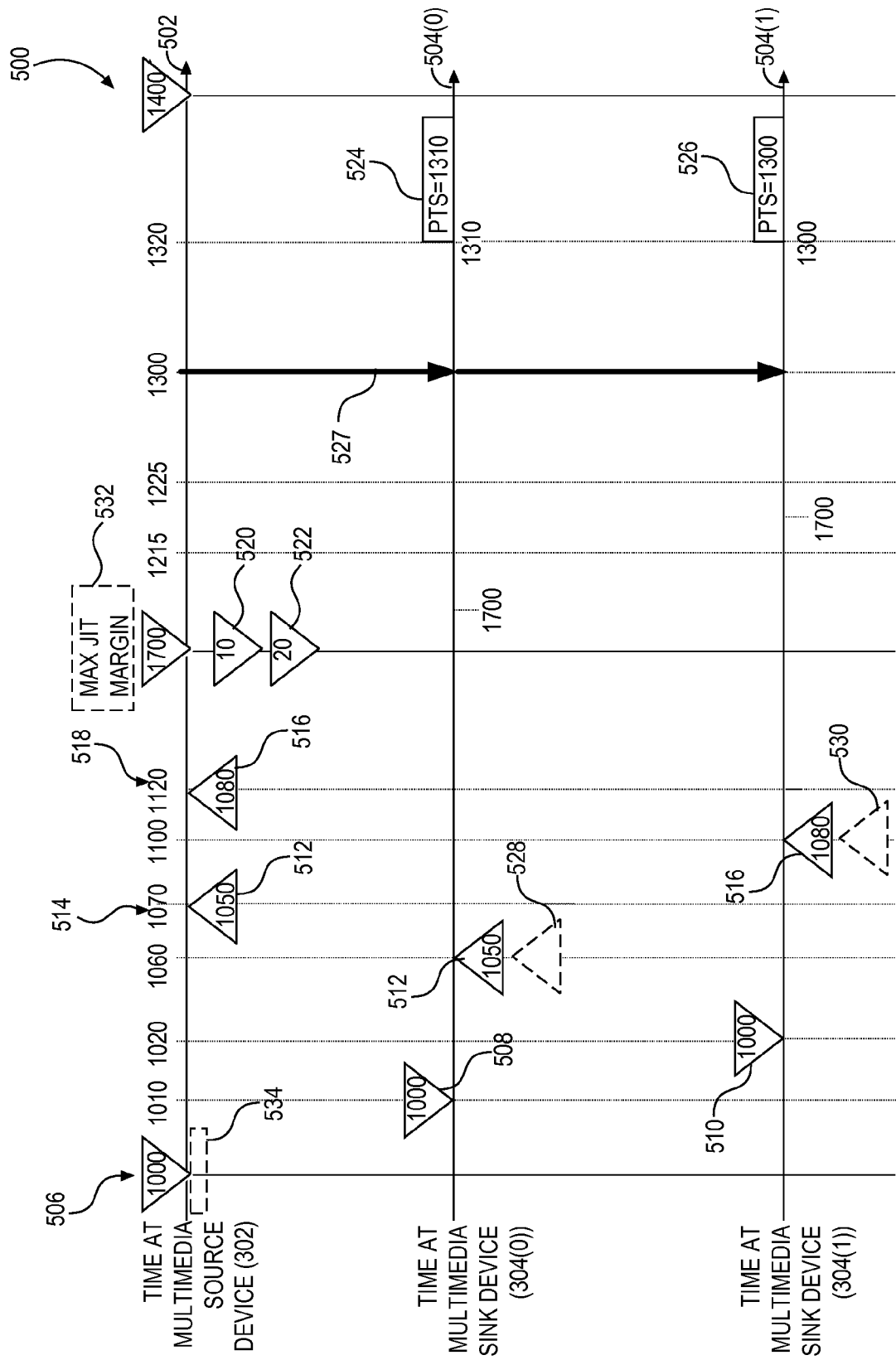
FIG. 5 is a signal diagram illustrating a source-based feedback system to synchronize multimedia sink devices.

In some aspects, wireless synchronization may be provided by operations carried out by the multimedia source device 302 of FIG. 3. In this regard, FIG. 5 provides a signal diagram 500 illustrating an exemplary aspect of a wireless synchronization mechanism by which a multimedia source device (e.g., the multimedia source device 302 of FIG. 3) may wirelessly synchronize multiple multimedia sink devices, such as the multimedia sink devices 304(0)-304(X) of FIG. 3. As seen in FIG. 5, the time at the multimedia source device 302 and the multimedia sink devices 304(0) and 304(1) are represented by horizontal arrows 502, 504(0), and 504(1), respectively. The labels above the horizontal arrow 502 indicate a value of a master PCR ($M_{PCR}$) provided by the multimedia source device 302. For purposes of illustration, the $M_{PCR}$ begins with a value of 1000 and proceeds to a value of 1400. It is assumed that the multimedia source device 302 has successfully established a wireless connection (not shown) with each of the multimedia sink devices 304(0) and 304(1). In some aspects, the $M_{PCR}$ may comprise an MPEG2-TS PCR.

At a time when the $M_{PCR}$ has a value of 1000 (indicated by arrow 506), the multimedia source device 302 transmits $M_{PCR}$s 508 and 510, each representing the current $M_{PCR}$ value, to the multimedia sink devices 304(0) and 304(1), respectively. According to some aspects, the multimedia sink devices 304(0) and 304(1) will each set its local PCR ($L_{PCR}$) to the received $M_{PCR}$ 508 (i.e., 1000). Some aspects may provide that each $L_{PCR}$ comprises an MPEG2-TS PCR. As shown in FIG. 5, the multimedia sink device 304(0) receives the $M_{PCR}$ 508 at a time when the $M_{PCR}$ at the multimedia source device 302 has a value of 1010. Similarly, the multimedia sink device 304(1) receives the $M_{PCR}$ 510 at a time when the $M_{PCR}$ at the multimedia source device 302 has a value of 1020. It is to be understood that the difference in arrival times may result from propagation delays and/or processing delays, as non-limiting factors.

With continuing reference to FIG. 5, the multimedia sink device 304(0) then transmits an $L_{PCR}$ feedback signal 512 to the multimedia source device 302 at a time when the $L_{PCR}$ of the multimedia sink device 304(0) has a value of 1050, which corresponds to the $M_{PCR}$ having a value of 1060. The $L_{PCR}$ feedback signal 512 is received by the multimedia source device 302 at a time when the $M_{PCR}$ has a value of 1070 (as indicated by arrow 514). Likewise, the multimedia sink device 304(0) sends an $L_{PCR}$ feedback signal 516 to the multimedia source device 302 at a time when the $L_{PCR}$ of the multimedia sink device 304(1) has a value of 1080. The multimedia source device 302 receives the $L_{PCR}$ feedback signal 516 from the multimedia sink device 304(1) when its master time is 1120 (as indicated by element 518).

Based on the $L_{PCR}$ feedback signals 512 and 516, the multimedia source device 302 as shown in FIG. 5 may calculate correction time intervals 520 and 522 reflecting a path delay for the multimedia sink devices 304(0) and 304(1), respectively. The correction time intervals 520 and 522 are each determined based on a difference between the $M_{PCR}$ at reception and the $L_{PCR}$ feedback signals 512 and 516, respectively. This difference is determined by the following equation wherein, d(k) represents the correction time interval, $M_{PCR}(t_i)$ represents the $M_{PCR}$ at reception, and $L_{PCR}(t_i)$ represents the $L_{PCR}$ feedback signal:

$$d(k)=(M_{PCR}(t_i)-L_{PCR}(t_i)/2$$

Thus, in the example of FIG. 5, the correction time interval 520 calculated for the multimedia sink device 304(0) is 10, which is determined by the difference between the $M_{PCR}$ at reception (i.e., 1070) and the $L_{PCR}$ feedback signal 512 (i.e., 1050), divided by two to account for the round-trip between the multimedia source device 302 and the multimedia sink device 304(0). Similarly, the correction time interval 522 calculated for the multimedia sink device 304(1) is 20 (i.e., the difference between the $M_{PCR}$ at reception (1070) and the $L_{PCR}$ feedback signal 516 (1050), divided by 2).

Based on the correction time intervals 520 and 522 calculated for each of the multimedia sink devices 304(0) and 304(1), respectively, the multimedia source device 302 may then generate PTS data 524 and 526 corresponding to a multimedia stream 527 sent to each of the multimedia sink devices 304(0) and 304(1). The PTS data 524 and 526 for the multimedia sink devices 304(0) and 304(1) are each customized by the multimedia source device 302 in order to ensure that the multimedia stream 527 is rendered in a synchronized fashion by the multimedia sink devices 304(0) and 304(1). The PTS data 524 and 526 may be generated by the multimedia source device 302 based on the following equation, in which $_{adj}PTS(k)$ represents the PTS for a given multimedia sink device, PTS(k) represents the desired PTS value for the multimedia sink device having the highest relative delay, $\Delta_{max}$ represents the highest relative delay (i.e., the correction time interval having the largest value), and d(k) represents the correction time interval of the given multimedia sink device:

$$_{adj}PTS(k)=PTS(k)+\Delta_{max}-d(k)$$

In the example of FIG. 5, to synchronize the multimedia stream 527 to be presented by the multimedia sink devices 304(0) and 304(1), it may be assumed that the desired PTS for the multimedia sink device having the highest relative delay (i.e., the PTS data 526 for the multimedia sink device 304(1)) will be 1300). Stated differently, the PTS data 526 for the multimedia sink device 304(1) will indicate that the multimedia sink device 304(1) should present the multimedia stream 527 when its $L_{PCR}$ has a value of 1300. As noted above, the correction time interval 520 calculated for the multimedia sink device 304(0) is 10, while the correction time interval 522 calculated for the multimedia sink device 304(1) is 20. Accordingly, using the equation above, the PTS data 524 generated for the multimedia sink device 304(0) will have a value of 1310 (i.e., 1300−20+10). Similarly, although the PTS data 526 for the multimedia sink device 304(1) is assumed to be 1300, applying the equation above yields the same result (i.e., 1300−20+20). The multimedia source device 302 then transmits each PTS data 524, 526 to the respective multimedia sink devices 304(0) and 304(1). In this manner, the multimedia sink devices 304(0) and 304(1) may present the multimedia stream 527 at different $L_{PCR}$s that correspond to the same $M_{PCR}$ value (i.e., 1320), resulting in a synchronized multimedia presentation.

It is to be understood that, in some aspects, in addition to its $L_{PCR}$, each of the multimedia sink devices 304(0) and 304(1) may also provide relative timing offsets 528 and 530, respectively, for one or more past $M_{PCR}$ receptions. The multimedia source device 302 may incorporate these relative timing offsets 528 and 530 in calculating each correction time interval 520, 522. Some aspects may provide that each of the multimedia sink devices 304(0) and 304(1), upon receiving the $M_{PCR}$ from the multimedia source device 302, may compare its $L_{PCR}$ to the $M_{PCR}$, and locally track statistics for relative jitters, which may result from variable transmission times from the multimedia sink devices 304(0), 304(1) to the multimedia source device 302. Each of the multimedia sink devices 304(0) and 304(1) may also utilize a moving time average or other adaptive algorithm to adjust its $L_{PCR}$ over time using these statistics.

It is to be further understood that, based on the reception of the $L_{PCR}$ of each of the multimedia sink devices 304(0) and 304(1), the multimedia source device 302 may track the relative skews of each of the multimedia sink devices 304(0) and 304(1). The multimedia source device 302 may use the relative skews of the multimedia sink devices 304(0) and 304(1) to best align presentation times for the multimedia stream 527 to be sent to each of the multimedia sink devices 304(0) and 304(1). In some aspects, multimedia content to be transmitted to each multimedia sink device 304(0) and 304(1) may include its own packetized elementary stream (PES) packetization along with timestamps. Accordingly, a maximum presentation hold time to align the multimedia sink devices 304(0) and 304(1) may be expressed as:

$$\Delta_{max}=\max\{d(1),\ldots,d(K)\}+\text{Jitter}_{margin}$$

In this manner, the multimedia source device 302 may compute a maximum jitter margin 532 that is required for the multimedia sink devices 304(0) and 304(1). It is to be understood that the multimedia source device 302 may use various time averaging or adaptive algorithms to best estimate this parameter.

In some applications, there may exist a need to further adjust the presentation times among the multimedia sink devices 304(0) and 304(1) to allow certain offsets in the PTS data 524 and 526. For example, a home installation setup procedure may include tuning the speakers to a specific "sweet-spot" in the room, such as a primary seating position within the room. This tuning may result in the addition or subtraction of delay from one or more multimedia sink devices 304(0) and 304(1) to best equalize the user sound experience. This may be achieved in some aspects by using an offset tuning time $\Delta_{tune}$ (k) for one or more multimedia sink devices 304(0) and 304(1) in the above calculations, as illustrated by the equation below:

$$_{adj}PTS(k)=PTS(k)+\Delta_{max}+\Delta_{tune}(k)-d(k)$$

According to some aspects, the multimedia source device 302 may include a timing tag 534 within packets that are transferred from one protocol stack layer to another (such as packets used in transmitting and/or receiving an $M_{PCR}$ and/or $L_{PCR}$ feedback signal). This may enable better estimation of timing delays during transmission or reception of the timing packets. As a non-limiting example, the timing tag 534 may be used by the multimedia source device 302 to track both when a packet is received by a protocol stack (not shown) or processor subsystem (not shown), and when the packet exits the protocol stack or processor subsystem. In this manner, the internal delays incurred while propagating the packets from a higher protocol stack layer and transmitting the packets may be tracked. This may enable the multimedia source device 302 to more accurately compensate for the link delay when carrying out calculations required for timing synchronization.

Figure 6:
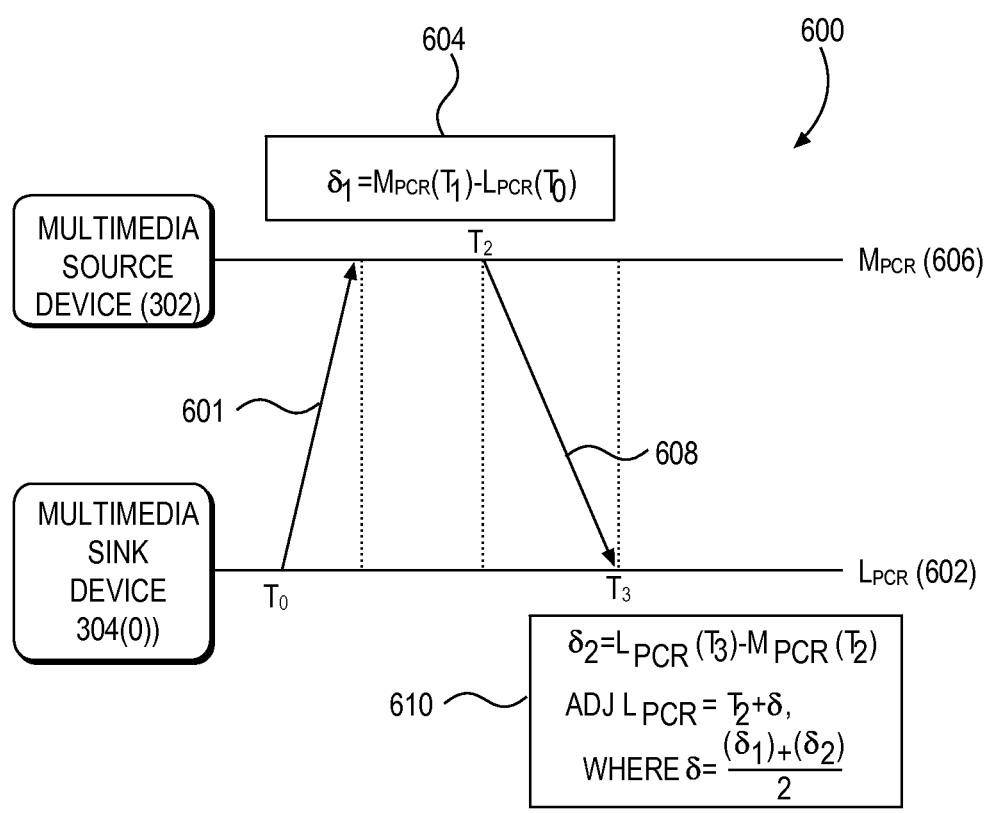
FIG. 6 is a signal diagram illustrating an exemplary sink-based feedback mechanism for providing wireless synchronization.

In some aspects, wireless synchronization information may be sent from a multimedia source device (such as the multimedia source device 302 of FIG. 3) to a multimedia sink device (e.g., each of the multimedia sink devices 304(0)-304(X) of FIG. 3) at the request of the multimedia sink device, and the multimedia sink device itself may calculate an appropriate delay and/or offset to provide wireless synchronization. In this regard, FIG. 6 is a signal diagram 600 provided to illustrate communications between the multimedia source device 302 and the multimedia sink device 304(0) for providing wireless synchronization. While the multimedia sink device 304(0) is referenced for illustrative purposes, it is to be understood that the communications illustrated herein may take place between the multimedia source device 302 and any of the multimedia sink devices 304(0)-304(X) of FIG. 3. It is to be further understood that in the example of FIG. 6, the multimedia source device 302 and the multimedia sink device 304(0) have established a wireless connection (not shown).

In the example of FIG. 6, the multimedia sink device 304(0) transmits a PCR request 601 at time $T_0$ to the multimedia source device 302. In some aspects, the PCR request 601 includes an $L_{PCR}$ 602 of the multimedia sink device 304(0), which at this point has the value $T_0$. The multimedia source device 302 may then calculate a correction time interval 604 of the $L_{PCR}$ 602 relative to an $M_{PCR}$ 606. As seen in FIG. 6, the correction time interval 604 may be expressed as $\delta_1 = M_{PCR}(T_1) - L_{PCR}(T_0)$, and may represent the relative skew observed at the multimedia source device 302. The multimedia source device 302 may respond to the multimedia sink device 304(0) at time $T_2$ of the $M_{PCR}$ 606 by sending a response 608 comprising the correction time interval 604 (designated as $\delta_1$), along with the current value $T_2$ of the $M_{PCR}$ 606, in some aspects. The multimedia sink device 304(0) may then receive the correction time interval 604 at time $T_3$ of the $L_{PCR}$ 602, and may calculate an updated $L_{PCR}$ 610 to align its local reference with the multimedia source device 302. In the example of FIG. 6, the updated $L_{PCR}$ 610 may be calculated as an adjusted $L_{PCR}$ expressed as adj$L_{PCR}=t_2+\delta$, where $\delta=(\delta_1+\delta_2)/2$ and $\delta_2=L_{PCR}(t_3)-M_{PCR}(t_2)$. According to some aspects, the $L_{PCR}$ 602 and/or the $M_{PCR}$ 606 may comprise an MPEG2-TS PCR.

It is to be understood that the operations illustrated in FIG. 6 may take relatively longer to converge to a stable timing alignment among multiple multimedia sink devices 304(0)-304(X) than the source-centric aspect discussed above with respect to FIG. 5. However, this sink-centric aspect shown in FIG. 6 has the advantage of being a distributed approach, and consequently the multimedia sink devices 304(0)-304(X) may adjust to any drift in synchronization over time. It is to be further understood that, in some aspects, the multimedia source device 302 and the multimedia sink devices 304(0)-304(X) may engage in a negotiation to determine whether the source-centric aspect or the sink-centric aspect technique will be employed for a given multimedia stream. Some aspects may provide that the $L_{PCR}$ 602 comprises an MPEG2-TS PCR.

Figure 7:
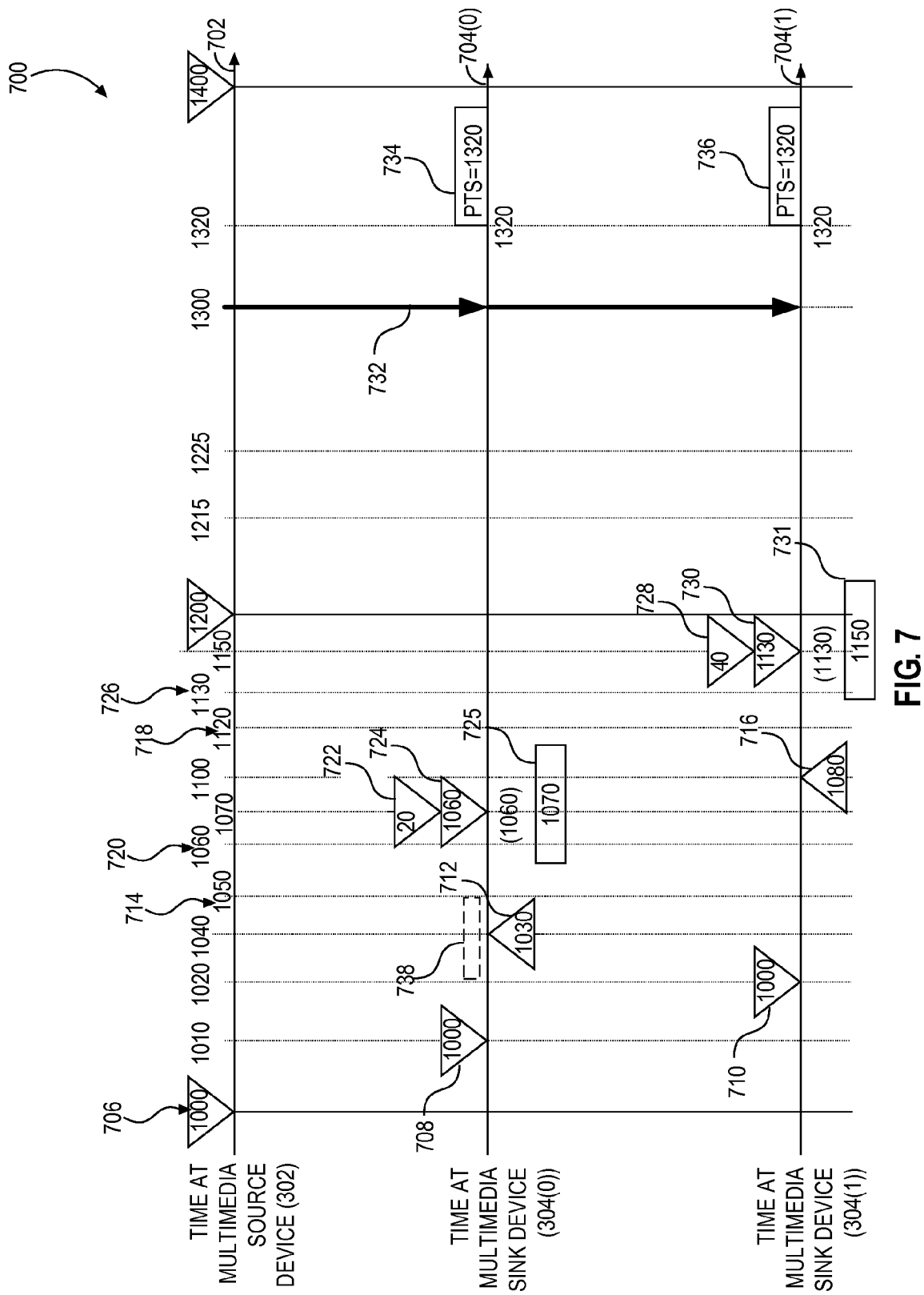
FIG. 7 is an illustration of a signal diagram illustrating operations of a sink-based feedback mechanism for calculating a delay to assist in synchronization.

To provide a more detailed signal diagram 700 illustrating an exemplary aspect introduced with reference to FIG. 6, FIG. 7 is provided. As seen in FIG. 7, the time at the multimedia source device 302 and the multimedia sink devices 304(0) and 304(1) are represented by horizontal arrows 702, 704(0), and 704(1), respectively. The labels above the horizontal arrow 702 indicate a value of a master PCR ($M_{PCR}$) provided by the multimedia source device 302. For purposes of illustration, the $M_{PCR}$ begins with a value of 1000 and proceeds to a value of 1400. It is assumed that the multimedia source device 302 has successfully established a wireless connection (not shown) with each of the multimedia sink devices 304(0) and 304(1).

In FIG. 7, the multimedia source device 302 sends out the $M_{PCR}$ at time 1000, as indicated by arrow 706. The $M_{PCR}$ is received by the multimedia sink devices 304(0) and 304(1) at varying times, as indicated by arrows 708 and 710. Upon receiving the $M_{PCR}$, each of the multimedia sink devices 304(0) and 304(1) sets its $L_{PCR}$ equal to the $M_{PCR}$ at the time of receipt. The multimedia sink device 304(0) subsequently sends a PCR request 712 at its $L_{PCR}$ 1030. The PCR request 712 is received at the multimedia source device 302 at a time when its $M_{PCR}$ has a value of 1050, as indicated by arrow 714. Similarly, the multimedia sink device 304(1) sends a PCR request 716 at its $L_{PCR}$ of 1080, which is received at the multimedia source device 302 at its $M_{PCR}$ of 1120, as indicated by arrow 718.

At the time point indicated by element 720, the multimedia source device 302 calculates and sends a correction time interval 722 for the multimedia sink device 304(0), along with a current $M_{PCR}$ value 724 (i.e., 1060). In this example, the multimedia sink device 304(0) receives the correction time interval 722 at its $L_{PCR}$ of 1060, corresponding to the $M_{PCR}$ of 1070. The correction time interval 722 received from the multimedia source device 302 has a value of 20. Based on the correction time interval 722, the multimedia sink device 304(0) calculates an updated $L_{PCR}$ 725 according to the equations described above. In particular, the updated $L_{PCR}$ 725 is set to the value of the current $L_{PCR}$ (i.e., 1060) summed with a value of the correction time interval 722 (i.e., 20) added to the difference between the current $L_{PCR}$ (i.e., 1060) and the received value of the $M_{PCR}$ (also 1060) divided by 2. The updated $L_{PCR}$ 725 thus equals 1060+(20+0)/2, or 1070.

Similarly, at the time point indicated by element 726, the multimedia source device 302 calculates and sends a correction time interval 728 for the multimedia sink device 304(1), along with a current $M_{PCR}$ value 730 (i.e., 1130). The multimedia sink device 304(1) then receives the correction time interval 728 at its $L_{PCR}$ of 1030, corresponding to the $M_{PCR}$ of 1150. The correction time interval 728 received from the multimedia source device 302 has a value of 40. Thus, based on the correction time interval 728, the multimedia sink device 304(1) calculates an updated $L_{PCR}$ 731 of 1150. In particular, the updated $L_{PCR}$ 731 is set to the value of the current $L_{PCR}$ (i.e., 100) summed with a value of the correction time interval 722 (i.e., 40) added to the difference between the current $L_{PCR}$ (i.e., 1130) and the received value of the $M_{PCR}$ (also 1130) divided by 2. The updated $L_{PCR}$ 731 thus equals 1130+(40+0)/2, or 1150.

The multimedia sink devices 304(0) and 304(1) may then receive a multimedia stream 732 from the multimedia source device 302, and may present the multimedia stream 732 based on the respective updated $L_{PCR}$s 725 and 731, respectively. For instance, when the multimedia sink devices 304(0) and 304(1) receive PTS data 734 and 736, respectively, associated with the multimedia stream 732, the multimedia sink devices 304(0) and 304(1) are correctly synchronized with the multimedia source device 302 and with each other.

For both source- and sink-centric approaches discussed above, convergence of the timing synchronization may take time due to cross-layer processing delays, which may vary based on factors such as operating system loads and variations in processing and transferring network packets containing the timing information. To reduce the initial convergence time, various optional approaches may be employed depending on the implementation platform choice and the chip set. In one aspect, transmission of PCR-containing data packets, such as PCR feedback or PCR requests, among multiple multimedia sink devices 304(0)-304(X) may be scheduled using an 801.11n-based power save multipoll (PSMP) scheduling. In this manner, downlink and uplink transmit times may be allocated to all multimedia sink devices 304(0)-304(X) involved in the synchronized media streaming for transmission and reception of frames containing timing information.

In some aspects, a multimedia sink device, such as the multimedia sink device 304(0), may provide a timing tag 738 within packets that are transferred from one protocol stack layer to another (such as packets used in transmitting and/or receiving a PCR request and/or a correction time interval). The timing tag 738 may enable better estimation of timing delays during transmission or reception of the packets. For instance, the timing tag 738 may be used by the multimedia sink device 304(0) to track both when a packet is received by a protocol stack (not shown) or processor subsystem (not shown), and when the packet exits the protocol stack or processor subsystem. In this manner, the internal delays incurred while propagating the packets from a higher protocol stack layer and transmitting the packets may be tracked. This may enable the multimedia sink device 304(0) to compensate more accurately for the link delay when carrying out calculations required for timing synchronization, and to enhance the accuracy and convergence of synchronization.

According to some aspects of both the source- and sink-centric approaches, a higher timer synchronization function provided by 802.11 may be employed. In such aspects, an upper layer may generate a MAC Layer Management Entity (MLME) Higher Layer (HL) synchronization request (MLME-HL-SYNC.request) to a MAC-service access point (MAC-SAP), along with MAC addresses of the multimedia sink devices 304(0)-304(X) for which timing packets will require tracking of the exact transmit time. When such packets with timing information are transmitted, the exact time will be provided to the upper layer using a MLME-HL-SYNC-indication primitive. The upper layer protocol stacks of the participating multimedia sink devices 304(0)-304(X) can track the timing by putting the exact transmit time of a previous packet, along with a unique sequence number, in the next packet.

Figure 8:
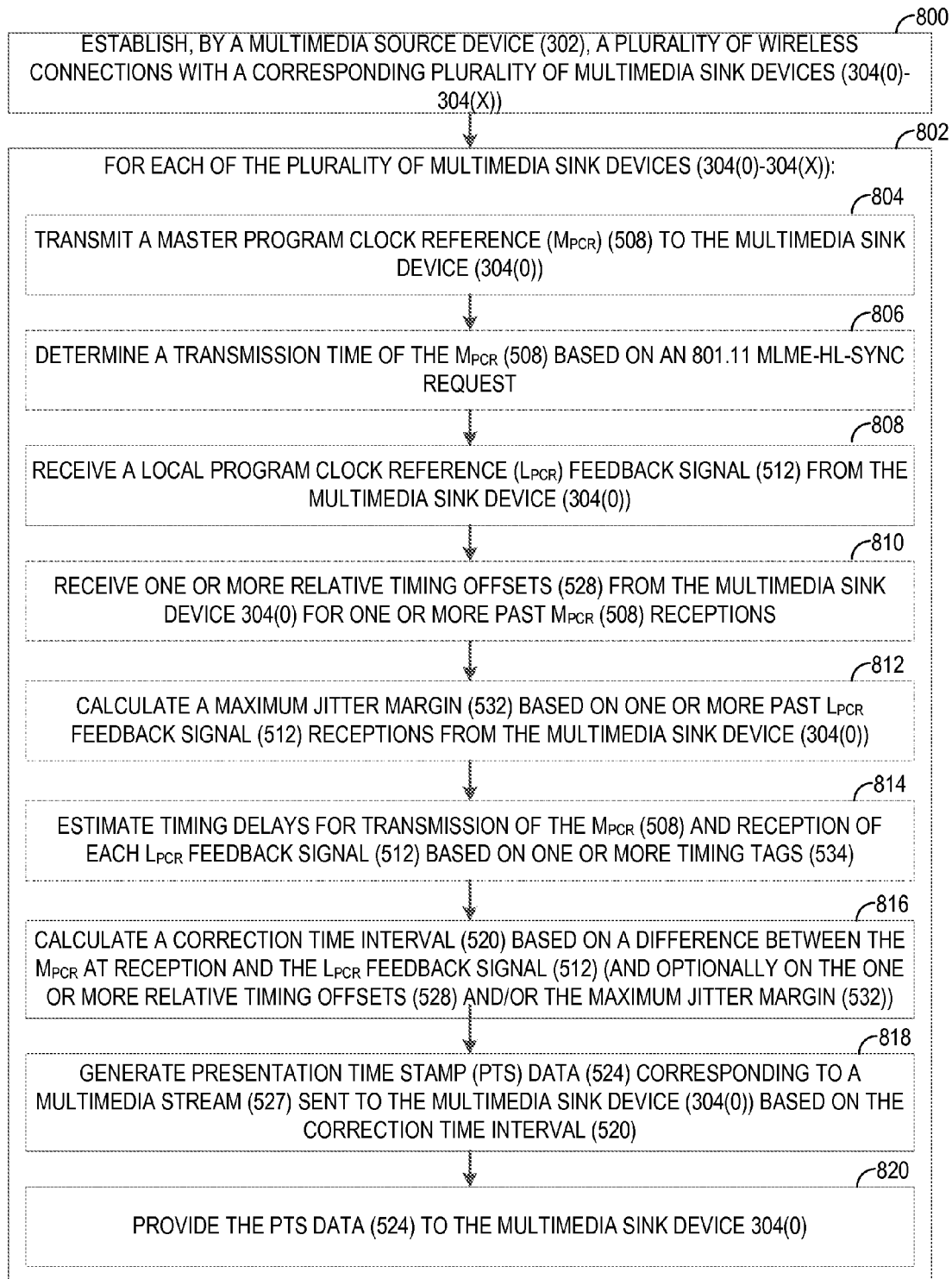
FIG. 8 is a flowchart illustrating exemplary operations for providing wireless synchronization using a source-based feedback mechanism.

FIG. 8 is a flowchart illustrating exemplary operations for providing wireless synchronization using a source-based feedback mechanism. For the sake of clarity, elements of FIGS. 3 and 5 are referenced in describing FIG. 8. In FIG. 8, operations begin with the multimedia source device 302 establishing a plurality of wireless connections with a corresponding plurality of multimedia sink devices 304(0)-304(X) (block 800). The operations shown in block 802 are then carried out for each of the plurality of multimedia sink devices 304(0)-304(X). In block 802, the multimedia source device 302 transmits an $M_{PCR}$ 508 to the multimedia sink device 304(0) (block 804). In some aspects, the multimedia source device 302 may determine a transmission time of the $M_{PCR}$ 508 based on an 801.11 MLME-HL-SYNC request (block 806). The multimedia source device 302 then receives an $L_{PCR}$ feedback signal 512 from the multimedia sink device 304(0) (block 808).

Some aspects may provide that the multimedia source device 302 also receives one or more relative timing offsets 528 from the multimedia sink device 304(0) for one or more past $M_{PCR}$ 508 receptions (block 810). According to some aspects, the multimedia source device 302 may calculate a maximum jitter margin 532 based on one or more past $L_{PCR}$ feedback signal 512 receptions from the multimedia sink device 304(0) (block 812). In some aspects, the multimedia source device 302 optionally may estimate timing delays for transmission of the $M_{PCR}$ 508 and reception of each $L_{PCR}$ feedback signal 512 based on one or more timing tags 534 (block 814).

The multimedia source device 302 then calculates a correction time interval 520 based on a difference between the $M_{PCR}$ at reception and the $L_{PCR}$ feedback signal 512, and optionally on the one or more relative timing offsets 528 and/or the maximum jitter margin 532 (block 816). The multimedia source device 302 then generates PTS data 524 corresponding to a multimedia stream 527 sent to the multimedia sink device 304(0) based on the correction time interval 520 (block 818). The PTS data 524 is then provided by the multimedia source device 302 to the multimedia sink device 304(0) (block 820).

Figure 9:
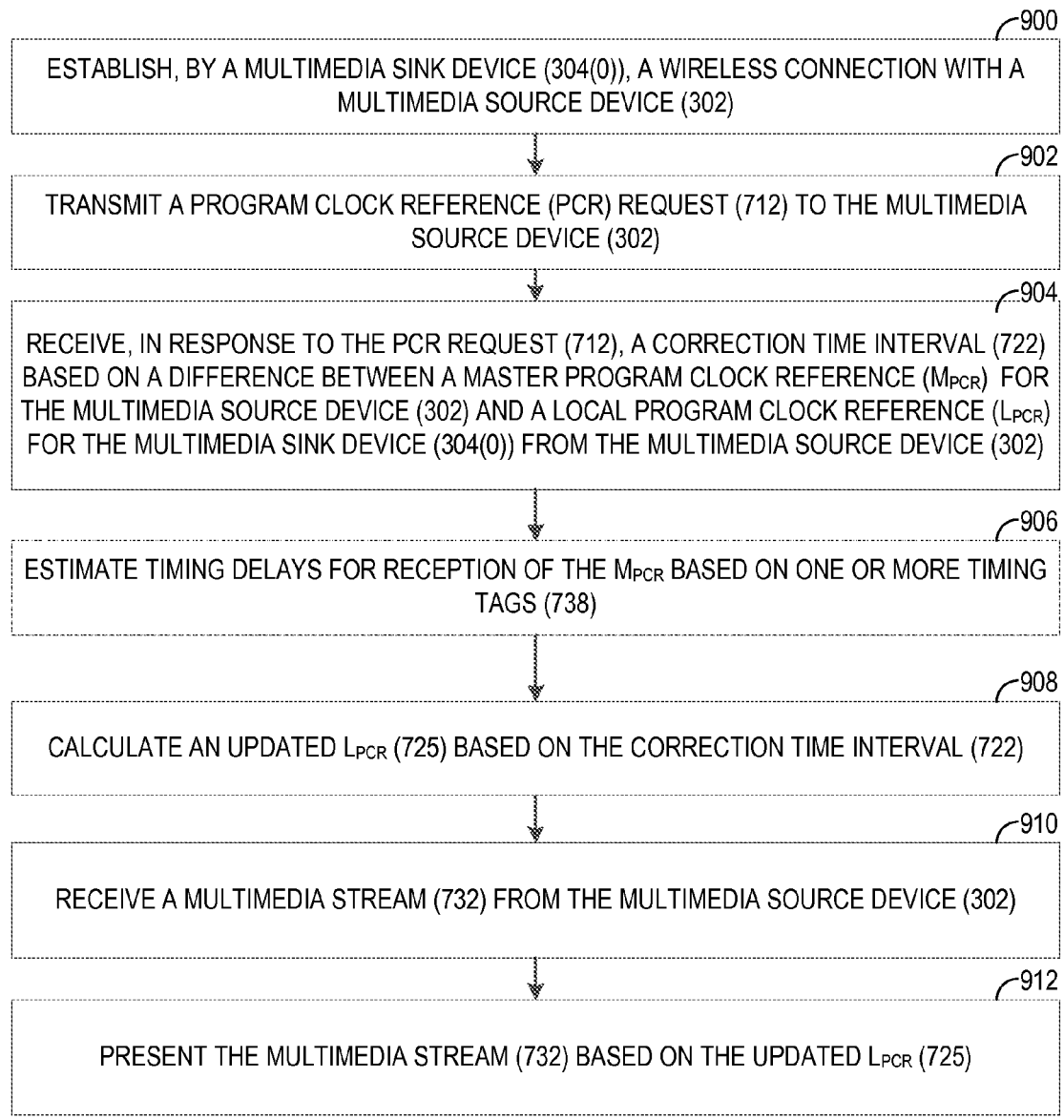
FIG. 9 is a flowchart illustrating exemplary operations of a source-based feedback mechanism for providing wireless synchronization.

To illustrate exemplary operations for providing wireless synchronization using a sink-based feedback mechanism, FIG. 9 is provided. For the sake of clarity, elements of FIGS. 3, 6, and 7 are referenced in describing FIG. 9. In FIG. 9, operations begin with the multimedia sink device 304(0) establishing a wireless connection with the multimedia source device 302 (block 900). The multimedia sink device 304(0) then transmits a PCR request 712 to the multimedia source device 302 (block 902). The multimedia sink device 304(0) receives, in response to the PCR request 712, a correction time interval 722 based on a difference between an $M_{PCR}$ for the multimedia source device 302 and an $L_{PCR}$ for the multimedia sink device 304(0) (block 904). In some aspects, the multimedia sink device 304(0) may estimate timing delays for reception of the $M_{PCR}$ based on one or more timing tags 738 (block 906).

The multimedia sink device 304(0) then calculates an updated $L_{PCR}$ 725 based on the correction time interval 722 (block 908). The multimedia sink device 304(0) receive a multimedia stream 732 from the multimedia source device 302 (block 910). The multimedia sink device 304(0) presents the multimedia stream 732 based on the updated $L_{PCR}$ 725 (block 912).

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for providing wireless synchronization of audio signals across a plurality of multimedia sink devices, comprising:
    establishing, by a multimedia source device, a plurality of wireless connections with a corresponding plurality of multimedia sink devices; and
    for each multimedia sink device of the plurality of multimedia sink devices:
        transmitting a master program clock reference ($M_{PCR}$) to the multimedia sink device;
        receiving, by the multimedia source device, a local program clock reference ($L_{PCR}$) feedback signal from the multimedia sink device, wherein the $M_{PCR}$ and the $L_{PCR}$ feedback signal comprise a Moving Pictures Expert Group version 2 transport stream (MPEG2-TS) program clock reference (MPEG2-TS PCR);
        calculating a correction time interval based on a difference between the $M_{PCR}$ at reception and the $L_{PCR}$ feedback signal;
        generating presentation time stamp (PTS) data corresponding to a multimedia stream sent to the multimedia sink device, based on the correction time interval; and
        providing the PTS data to the multimedia sink device such that each multimedia sink device of the plurality of multimedia sink devices may generate a synchronized audio output relative to others of the plurality of multimedia sink devices.

2. The method of claim 1, further comprising, for each multimedia sink device of the plurality of multimedia sink devices:
    receiving one or more relative timing offsets from the multimedia sink device for one or more past $M_{PCR}$ receptions; and
    calculating the correction time interval further based on the one or more relative timing offsets.

3. The method of claim 1, further comprising, for each multimedia sink device of the plurality of multimedia sink devices:
    calculating a maximum jitter margin based on one or more past $L_{PCR}$ feedback signal receptions from the multimedia sink device; and
    calculating the correction time interval further based on the maximum jitter margin.

4. The method of claim 1, wherein generating the PTS data is based on an offset tuning time for each multimedia sink device of the plurality of multimedia sink devices.

5. The method of claim 1, comprising transmitting the $M_{PCR}$ to the multimedia sink device using 802.11n-based power save multi-poll (PSMP) scheduling.

6. The method of claim 1, further comprising estimating timing delays for transmission of the $M_{PCR}$ and reception of the $L_{PCR}$ feedback signal based on one or more timing tags.

7. The method of claim 1, further comprising determining a wireless transmission time of the $M_{PCR}$ based on an 802.11 MAC Layer Management Entity (MLME) Higher Layer (HL) synchronization (MLME-HL-SYNC) request.

8. A method for synchronizing a multimedia sink device with a multimedia source device, comprising:
    establishing, by a multimedia sink device, a wireless connection with a multimedia source device;
    transmitting a program clock reference (PCR) request to the multimedia source device;
    receiving, in response to the PCR request, a correction time interval based on a difference between a master program clock reference ($M_{PCR}$) for the multimedia source device and a local program clock reference ($L_{PCR}$) for the multimedia sink device wherein the $M_{PCR}$ and the $L_{PCR}$ comprise a Moving Pictures Expert Group version 2 transport stream (MPEG2-TS) program clock reference (MPEG2-TS PCR);
    calculating an updated $L_{PCR}$ based on the correction time interval;
    receiving a multimedia stream from the multimedia source device; and
    presenting the multimedia stream based on the updated $L_{PCR}$.

9. The method of claim 8, wherein:
    the multimedia stream comprises an MPEG2-TS.

10. The method of claim 8, further comprising estimating timing delays for transmission of the PCR request and reception of the correction time interval based on one or more timing tags.

11. A wireless multimedia source device, comprising:
    a wireless network interface controller communicatively coupled to an antenna;
    a system clock; and
    a control system communicatively coupled to the wireless network interface controller and the system clock, the control system configured to:
        establish, using the wireless network interface controller, a plurality of wireless connections with a corresponding plurality of multimedia sink devices; and
        for each multimedia sink device of the plurality of multimedia sink devices:
            transmit, via the wireless network interface controller, a master program clock reference ($M_{PCR}$) provided by the system clock to the multimedia sink device;
            receive, via the wireless network interface controller, a local program clock reference ($L_{PCR}$) feedback signal from the multimedia sink device, wherein the $M_{PCR}$ and the $L_{PCR}$ feedback signal comprise a Moving Pictures Expert Group version 2 transport stream (MPEG2-TS) program clock reference (MPEG2-TS PCR);

calculate a correction time interval based on a difference between the $M_{PCR}$ at reception and the $L_{PCR}$ feedback signal;

generate presentation time stamp (PTS) data corresponding to a multimedia stream sent to the multimedia sink device, based on the correction time interval; and provide, via the wireless network interface controller, the PTS data to the multimedia sink device such that each multimedia sink device of the plurality of multimedia sink devices may generate a synchronized audio output relative to others of the plurality of multimedia sink devices.

12. The wireless multimedia source device of claim 11, wherein the control system is further configured to, for each multimedia sink device of the plurality of multimedia sink devices:

receive one or more relative timing offsets from the multimedia sink device for one or more past $M_{PCR}$ receptions; and calculate the correction time interval further based on the one or more relative timing offsets.

13. The wireless multimedia source device of claim 11, wherein the control system is further configured to, for each multimedia sink device of the plurality of multimedia sink devices:

calculate a maximum jitter margin based on one or more past $L_{PCR}$ feedback signal receptions from the multimedia sink device; and calculate the correction time interval further based on the maximum jitter margin.

14. The wireless multimedia source device of claim 11, wherein the control system is configured to generate the PTS data based on an offset tuning time for each multimedia sink device of the plurality of multimedia sink devices.

15. The wireless multimedia source device of claim 11, wherein the control system is configured to transmit the $M_{PCR}$ to the multimedia sink device using 802.11n-based power save multi-poll (PSMP) scheduling.

16. The wireless multimedia source device of claim 11, wherein the control system is further configured to estimate timing delays for transmission of the $M_{PCR}$ and reception of the $L_{PCR}$ feedback signal based on one or more timing tags.

17. The wireless multimedia source device of claim 11, wherein the control system is further configured to determine a transmission time of the $M_{PCR}$ based on an 802.11 MAC Layer Management Entity (MLME) Higher Layer (HL) synchronization (MLME-HL-SYNC) request.

18. A wireless multimedia sink device, comprising:
a transceiver communicatively coupled to an antenna;
a system clock; and
a control system communicatively coupled to the transceiver and the system clock, the control system configured to:
establish, using the transceiver, a wireless connection with a multimedia source device;
transmit, via the transceiver, a program clock reference (PCR) request to the multimedia source device;
receive, via the transceiver in response to the PCR request, a correction time interval based on a difference between a master program clock reference ($M_{PCR}$) for the multimedia source device and a local program clock reference ($L_{PCR}$) provided by the system clock, wherein the $M_{PCR}$ and $L_{PCR}$ comprise a Moving Pictures Expert Group version 2 transport stream (MPEG2-TS) program clock reference (MPEG2-TS PCR);
calculate an updated $L_{PCR}$ based on the correction time interval;
receive, via the transceiver, a multimedia stream from the multimedia source device; and
present the multimedia stream based on the updated $L_{PCR}$.

19. The wireless multimedia sink device of claim 18, wherein:
the multimedia stream comprises an MPEG2-TS.

20. The wireless multimedia sink device of claim 18, wherein the control system is further configured to estimate timing delays for transmission of the PCR request and reception of the correction time interval based on one or more timing tags.

* * * * *